(12) United States Patent
Yu et al.

(10) Patent No.: US 12,361,524 B2
(45) Date of Patent: Jul. 15, 2025

(54) INFORMATION PROCESSING DEVICE AND METHOD, AND COMPUTER READABLE STORAGE MEDIUM

(71) Applicant: Sony Group Corporation, Tokyo (JP)

(72) Inventors: Yitong Yu, Beijing (CN); Jing Wang, Beijing (CN); Kuanhong Xu, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 437 days.

(21) Appl. No.: 17/916,813

(22) PCT Filed: May 7, 2021

(86) PCT No.: PCT/CN2021/092005
§ 371 (c)(1),
(2) Date: Oct. 4, 2022

(87) PCT Pub. No.: WO2021/227934
PCT Pub. Date: Nov. 18, 2021

(65) Prior Publication Data
US 2023/0153954 A1  May 18, 2023

(30) Foreign Application Priority Data

May 14, 2020 (CN) .......................... 202010408019.5

(51) Int. Cl.
*G06T 5/70* (2024.01)
*G06T 7/90* (2017.01)

(52) U.S. Cl.
CPC .................. *G06T 5/70* (2024.01); *G06T 7/90* (2017.01); *G06T 2207/10024* (2013.01);
(Continued)

(58) Field of Classification Search
CPC ........ G06V 10/30; G06V 10/70; G06V 10/82; G06T 5/70; G06T 7/90;
(Continued)

(56) References Cited

U.S. PATENT DOCUMENTS

2017/0269187 A1  9/2017  Ikeda
2020/0327648 A1* 10/2020  Lin ...................... H04N 23/684

FOREIGN PATENT DOCUMENTS

CN  106973194 A  7/2017
CN  110557584 A  12/2019
(Continued)

OTHER PUBLICATIONS

International Search Report and Written Opinion mailed on Aug. 10, 2021, received for PCT Application PCT/CN2021/092005, filed on May 7, 2021, 11 pages including English Translation.
(Continued)

*Primary Examiner* — Phuoc Tran
(74) *Attorney, Agent, or Firm* — XSENSUS LLP

(57) ABSTRACT

The present application relates to an information processing device and method, and a computer readable storage medium. The information processing device comprises a processing circuit, configured to generate a composite noise image on the basis of an input original image, process the black level in the composite noise image, and train, on the basis of the processed composite noise image, a machine learning model used for image denoising, to obtain a trained machine learning model.

18 Claims, 6 Drawing Sheets

(52) U.S. Cl.
CPC ............... *G06T 2207/10144* (2013.01); *G06T 2207/20081* (2013.01); *G06T 2207/20084* (2013.01); *G06T 2207/20212* (2013.01)

(58) Field of Classification Search
CPC ........... G06T 2207/10024; G06T 2207/10144; G06T 2207/20081; G06T 2207/20084; G06T 5/60; G06T 5/50; G06N 3/08; G06N 20/00; H04N 25/60
See application file for complete search history.

(56) References Cited

FOREIGN PATENT DOCUMENTS

| CN | 110992272 A | 4/2020 |
|---|---|---|
| CN | 111127336 A | 5/2020 |
| JP | 2013240091 A | 11/2013 |
| JP | 2019121252 A | 7/2019 |

OTHER PUBLICATIONS

Brooks et al., "Unprocessing Images for Learned Raw Denoising", IEEE/CVF Conference on Computer Vision and Pattern Recognition, 2019, pp. 11036-11045.
Jiang, "Research and Implementation of Dark Image Denoising and Enhancement Algorithm Based on Generative Adversarial Networks", Information & Technology, China Master's Theses Full-Text Database, No. 3, Mar. 15, 2020, pp. 1-73.
Chen Chen et al: "Learning to See in the Dark", Proceedings of the IEEE Conference on Computer Vision and Pattern Recognition, IEEE, Jun. 18, 2018 (Jun. 18, 2018), pp. 3291-3300, XP033476298.
Wang Wei et al: "Enhancing Low Light Videos by Exploring High Sensitivity Camera Noise", 2019 IEEE/CVF International Conference on Computer Vision (ICCV), IEEE, Oct. 27, 2019 (Oct. 27, 2019), pp. 4110-4118, XP033724110.

\* cited by examiner

INFORMATION PROCESSING DEVICE AND METHOD, AND COMPUTER READABLE STORAGE MEDIUM

CROSS-REFERENCE TO RELATED APPLICATIONS

The present application is based on PCT filing PCT/CN2021/092005, filed May 7, 2021, which claims priority to Chinese Patent Application No. 202010408019.5, titled "INFORMATION PROCESSING DEVICE AND METHOD, AND COMPUTER READABLE STORAGE MEDIUM", filed on May 14, 2020 with the China National Intellectual Property Administration, the entire contents of each are incorporated herein by reference in its entirety.

FIELD

The present disclosure relates to the technical field of information processing, and in particular to processing for a black level in images, and more particularly to an information processing apparatus and method, and a computer-readable storage medium.

BACKGROUND

In the field of image denoising, synthetic data is easily acquired and analyzed, and therefore is commonly used to train deep learning-based denoising models. However, researches on testing a trained denoising model in a real scene show that the denoising model trained based on a synthesized noise image presents poor performance in denoising an image in the real scene, thus affecting the quality of the denoised image. The performance is exacerbated in dim environments due to inaccurate black level in the synthesized noise image.

SUMMARY

A summary of the present disclosure is given hereinafter to provide a basic understanding of some aspects of the present disclosure. It should be understood that, the summary is not an exhaustive summary of the present disclosure, and is neither intended to determine key or important parts of the present disclosure, nor intended to limit the scope of the present disclosure. Instead, the summary is only to provide some concepts in a simplified form, as a preamble of a detailed description later.

According to an aspect of the present disclosure, an information processing apparatus is provided. The information processing apparatus includes a processing circuit configured to: generate a synthesized noise image based on an input original image; and process a black level in the synthesized noise image, and train a machine learning model for image denoising based on the processed synthesized noise image to obtain a trained machine learning model.

In the information processing apparatus according to the embodiment of the present disclosure, the black level in the synthesized noise image is processed so that the influence on training for the machine learning model due to the inaccuracy of the black level is reduced, thereby improving denoising performance of the trained machine learning model trained based on the processed synthesized noise image.

According to another aspect of the present disclosure, an information processing device is provided. The information processing device includes a processing circuit configured to: input an image to be processed into the trained machine learning model obtained by the above information processing apparatus, to perform denoising processing on the image to be processed.

The information processing device according to the embodiment of the present disclosure can more accurately remove noise from the image to be processed.

According to another aspect of the present disclosure, an information processing method is provided. The information processing method includes: generating a synthesized noise image based on an input original image; and processing a black level in the synthesized noise image, and training a machine learning model for image denoising based on the processed synthesized noise image to obtain a trained machine learning model.

According to another aspect of the present disclosure, an information processing method is provided. The information processing method includes: inputting an image to be processed into a trained machine learning model obtained by the above information processing apparatus, so as to perform denoising processing on the image to be processed.

According to other aspects of the present disclosure, a computer program code and a computer program product for implementing the above information processing method, and a computer-readable storage medium on which the computer program code for implementing the above information processing method is recorded are provided.

BRIEF DESCRIPTION OF THE DRAWINGS

For a further illustration of the above and other advantages and features of the present disclosure, embodiments of the present disclosure are described in detail hereinafter in conjunction with the accompanying drawings. The drawings, together with the detailed description below, are incorporated into and form a part of the specification. Elements having the same function and structure are denoted by the same reference numerals. It should be noted that the drawings only illustrate typical embodiments of the present disclosure and should not be construed as a limitation to the scope of the present disclosure. In the drawings.

DETAILED DESCRIPTION OF EMBODIMENTS

Hereinafter, a black level is first introduced in conjunction with a conventional image sensor and the like.

Figure 1:
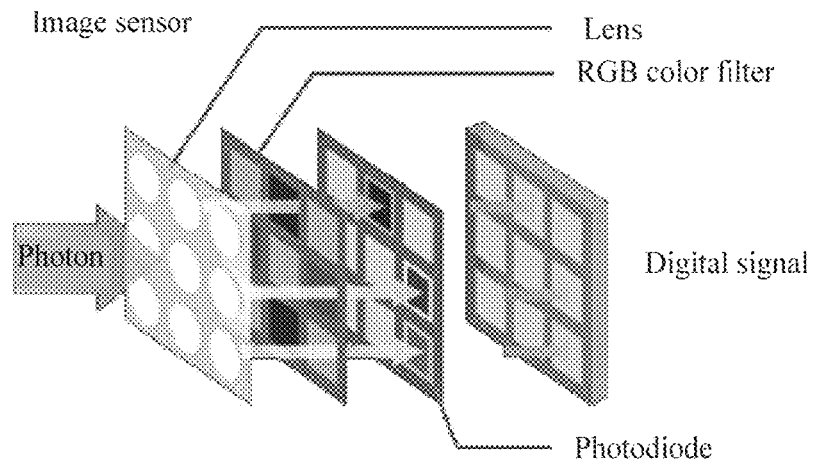
FIG. 1 is a schematic diagram illustrating a conventional image sensor.

FIG. 1 is a schematic diagram illustrating a conventional image sensor. As shown in FIG. 1, the photon (that is, optical signal) irradiates an array of photodiodes (which may be equivalent to a sensor) through a lens and an RGB color filter. The photodiode converts the optical signal into a photocurrent based on the photoelectric effect. The photocurrent generated by each of the photodiodes is amplified by an amplifier (not shown in FIG. 1) and transmitted to an ADC (analog-to-digital converter), in which the photocurrent is finally converted into a digital signal.

The photodiode generates a reverse direct current (i.e., a dark current) even in the absence of light illumination. Therefore, the photodiode is a device which generates a dark current. In order to solve this problem, the dark current is counteracted by setting the black level in the conventional technology.

The black level refers to a signal level when image data is 0 (i.e., when there is no light being outputted) on a display device that has been calibrated to a certain extent. The display device is, for example, a digital photography device (including a digital camera and a digital video camera), a television, a mobile phone, a display, and the like. The method for acquiring a black level in the conventional technology is described below by taking the digital camera as an example. The black level is initially acquired through the calibration of black reference columns. Afterwards, due to the development of electronic devices, the change of the dark current is insignificant, the black reference columns are removed from the conventional camera, and the black level is manually set (where calculation of the black level varies from camera manufacturer to camera manufacturer, and the black level is usually set to a scalar, such as 512).

Figure 2:
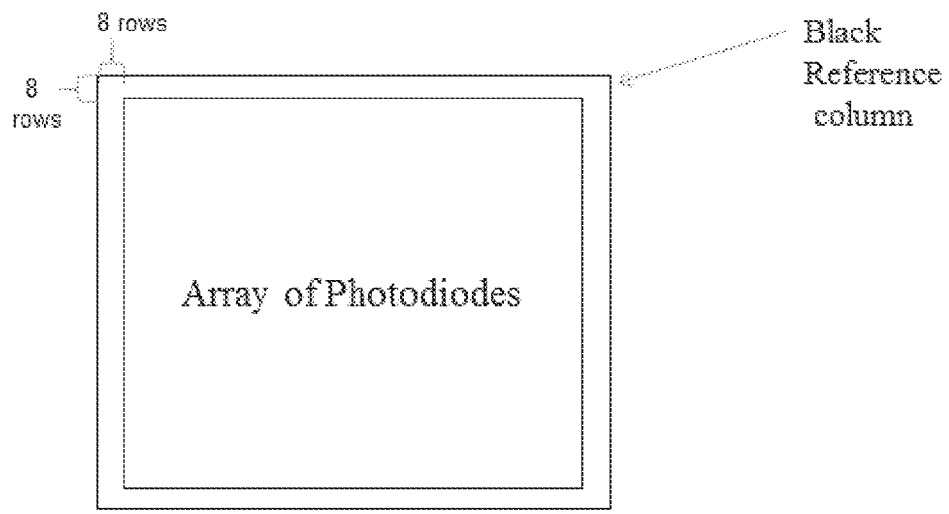
FIG. 2 is a schematic diagram illustrating a black reference column.

FIG. 2 is a schematic diagram illustrating a black reference column.

As shown in FIG. 2, the black reference column is a region which is designed next to the array of photodiodes and cannot be exposed to light. In general, the black reference column is 8 rows in size, and is also provided with photodiodes like the array of photodiodes. However, the photodiodes on the black reference column are not illuminated by light. A signal on the black reference column is also amplified by the amplifier, read out and ADC converted. Finally, the camera calculates the black level based on a digital signal map obtained by the black reference column through the ADC.

As mentioned above, the black level manually set or calculated fails to accurately represent the dark current, and may result in a black level error c. This error becomes more apparent in dark light.

Illustrative embodiments of the present disclosure are described hereinafter in conjunction with the drawings. For the sake of clarity and conciseness, not all features of an actual embodiment are described in the specification. However, it should be appreciated that numerous implementation-specific decisions, for example, to comply with constraining conditions related to the system and business, shall be made during development of any of such actual implementations so as to achieve the specific goals of a developer. The constraining conditions may vary from one implementation to another. Furthermore, it should also be understood that although the development work may be very complicated and time-consuming, for those skilled in the art benefiting from the present disclosure, such development work is only a routine task.

Here, it should further be noted that in order to avoid obscuring the present disclosure due to unnecessary details, only a device structure and/or processing step closely related to the solutions according to the present disclosure are illustrated in the drawings, and other details less related to the present disclosure are not given.

Embodiments according to the present disclosure will be described in detail below with reference to the accompanying drawings.

Figure 3:
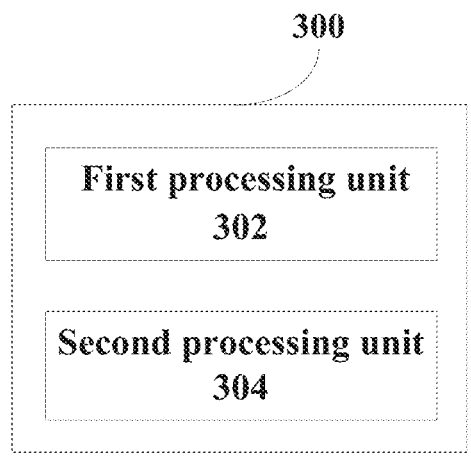
FIG. 3 is a block diagram illustrating functional modules of an information processing apparatus according to an embodiment of the present disclosure.

FIG. 3 is a block diagram illustrating functional modules of an information processing apparatus 300 according to an embodiment of the present disclosure. As shown in FIG. 3, the information processing apparatus 300 includes: a first processing unit 302 and a second processing unit 304. The first processing unit 302 is configured to generate a synthesized noise image based on an input original image. The second processing unit 304 is configured to process a black level in the synthesized noise image and train a machine learning model for image denoising based on the processed synthesized noise image, to obtain a trained machine learning model.

Figure 4:
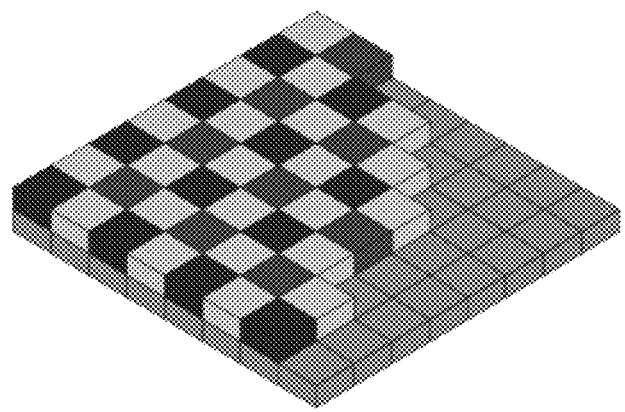
FIG. 4 is a diagram illustrating an example of a color filter array of a sensor.

As an example, the original image includes RGB data in a RAW format (which may also be referred to as a raw-RGB image or raw image). The raw-RGB image directly reflects generation of electrons after photons passing through a sensor such as a CCD/CMOS (charge coupled device/complementary metal oxide semiconductor). FIG. 4 is a diagram illustrating an example of a color filter array (CFA) of a sensor (e.g., the CCD/CMOS). Sensor data in the RAW format usually exists in the form of CFA. A CFA is an array of pixels in size of H×W (where H and W are dimensions of the sensor, H represents the height and W represents the width). Each of the pixels carries information about a single color channel of red, green, or blue. The light falling on any given photodiode in CMOS is recorded as the number of some electrons in a capacitor, and therefore is only stored as a scalar. A single pixel fails to retain three-dimensional properties of the light that are observable. CFA provides the compromise that information about each of the three color channels is captured at different locations by means of spectrally selectable filters placed on each pixel. Hereinafter, the size of the original image is denoted as H×W.

As an example, the machine learning model is a neural network. For example, the neural network may be a convolutional neural network or the like, such as a U-net neural network, a Senet neural network, or a SKnet neural network.

In the information processing apparatus 300 according to the embodiment of the present disclosure, the black level in the synthesized noise image is processed so that the influence on training for the machine learning model due to the inaccuracy of the black level is reduced, thereby improving denoising performance of the trained machine learning model trained based on the processed synthesized noise image.

In addition, training the machine learning model based on the synthesized noise image saves time and effort. In a process of training the machine learning model, a collector has to fix the camera for two shots, and the object is prevented from moving between the two shots in order to collect paired image data including the original image and the real noise image. In the presence of the synthesized noise image, it is unnecessary to collect the paired data including the original image and the real noise image on the spot. Instead, only the synthesized noise image is synthesized based on the original image. Additionally, the machine learning model is trained based on the synthesized noise image rather than the paired images including the original image and the real noise image, thereby reducing costs of manual annotation. With operability of the synthesized noise image, a more robust machine learning model can be acquired based on less data.

As an example, the original image is a long-exposure image captured by an image acquisition device in a long-exposure state, and the synthesized noise image is utilized to simulate a short-exposure image captured by the image acquisition device in dim environment.

For example, the image acquisition device may be a digital photography device (including a digital camera or a digital video camera, etc.). Those skilled in the art should understand that the image acquisition device may also be a device that acquires RGB data in a RAW format in additional to the digital photography device.

For example, the image acquisition device may be the information processing apparatus 300. Alternatively, the image acquisition device may be different from the information processing apparatus 300 (e.g., the image acquisition device may be a digital camera or a digital video camera, and the information processing apparatus 300 may be a mobile phone or a computer, or the like). Hereinafter, for the convenience of description, the image acquisition device and the information processing apparatus 300 are assumed to be the same digital camera, unless specifically explained.

For example, the long-exposure image and the short-exposure image each are an image actually captured by the image acquisition device. The long-exposure image is a clean, noise-free image captured in a long-exposure state. The short exposure image is a noisy image captured in a dim environment. The synthesized noise image is generated based on the original image as a long exposure image, to simulate a short exposure image.

In a case that the synthesized noise image is used to simulate the short-exposure image captured by the image acquisition device in a dim environment, the denoising performance of the trained machine learning model for the short-exposure image captured in the dim environment is improved. The above trained machine learning model may also be applied to tasks, for example, all-weather automatic driving, nighttime face recognition.

As an example, the first processing unit 302 may be configured to perform noise processing on the original image based on noise parameters acquired from the original image, to generate the synthesized noise image.

For example, the noise of the original image captured by the digital photography device is mainly shot noise and a readout noise. The above noise parameter may be a parameter related to the readout noise (abbreviated as a readout noise parameter) a and a parameter related to the shot noise (abbreviated as a shot noise parameter) β acquired from the original image. Those skilled in the art may easily conceive of other examples of the noise parameter, which is described herein.

As an example, the first processing unit 302 may be configured to linearize the original image based on a black level and a white level acquired from the original image, to obtain a linearized image of the original image, and the first processing unit 302 may be configured to perform noise processing on the linearized image to generate the synthesized noise image.

For example, the white level refers to a signal level when the image data is a peak white level on a display device that has been calibrated to a certain extent. As described above, the display device is, for example, a digital photography device (including a digital camera and a digital video camera), a television, a mobile phone, a display.

Assuming that a value of a pixel in the original image is RawImage, the white level is n and the black level is m, the pixel value y of a corresponding pixel in the linearized image of the original image (hereinafter, for convenience of description, sometimes the linearized image of the original image is simply referred to as image y) may be expressed as:

$$y = \min\left\{\max\left\{\frac{\text{Raw Image} - m}{n - m}, 0\right\}, 1\right\}$$ Expression (1)

In Expression (1), max{ } represents calculation of a maximum value and min{ } represents calculation of a minimum value. The linearized image y of the original image is obtained by limiting each pixel in the original image to a value ranging from 0 to 1 through the linearization based on expression (1).

For example, a gain multiplier of the linearized image y may be changed. For example, a value of a pixel in a partial image of the linearized image y is divided by a predetermined value (e.g., 100 or 300).

For example, at least one of Gaussian noise, Poisson noise, Gauss-Poisson noise, or Heteroscedastic-Gaussian noise (the noise n may be denoted as n~N(0, (β×y+α))) or the like may be added to the image y based on the readout noise parameter α and shot noise parameter β acquired from the original image, to generate a synthesized noise image with a pixel value of z (hereinafter, the synthesized noise image is simply referred to as a synthesized noise image z).

As an example, the second processing unit 304 may be configured to acquire predetermined image acquisition parameters from the original image, acquire a corresponding offset image based on correspondence relationship between the predetermined image acquisition parameter and the offset images for processing the black level, and process the black level in the synthesized noise image based on the acquired offset image.

The information processing apparatus 300 according to the embodiment of the present disclosure processes the black level in the synthesized noise image based on the acquired offset image, so that the black level in the processed synthesized noise image more accurately represents the dark current. Therefore, the black level error a is reduced so that the processed synthesized noise image approximates the real noise image.

As an example, the correspondence relationship is generated as follows. In a dim environment, for each predetermined image acquisition parameter of the image acquisition device, an offset image corresponding to the predetermined image acquisition parameter is obtained based on a black image captured for the predetermined image acquisition parameter. The correspondence relationship generated in this way facilitates the processing of the black level in the synthesized noise image in the dim environment.

For example, the black image may be an image captured with an image acquisition component in the image acquisition device being covered by a black object. Those skilled in the art may easily conceive of other ways to capture a black image, which is not described herein.

As an example, the image acquisition device is a digital photography device. The predetermined image acquisition parameters include exposure time and light sensitivity (ISO) of the digital photography device. The correspondence relationship is generated as follows. A lid of the digital photography device is closed. A black image is captured for each pair of parameters of the exposure time and the light sensitivity of the digital photography device. The black image is preprocessed to obtain the offset image corresponding to each pair of parameters.

As mentioned above, the image acquisition device may be a device that acquires RGB data in a RAW format in additional to the digital photography device, and accordingly the predetermined image acquisition parameters may be other parameters in additional to the exposure time and the light sensitivity, which are not described in detail herein. Hereinafter, description is made with the digital photography device serving as the image acquisition device. Hereinafter, for convenience of description, the digital photography device is sometimes referred to as a digital camera or a camera.

The reason that the exposure time and the light sensitivity of the digital photography device serve as the predetermined image acquisition parameters lies in that the black level error ε is affected by the exposure time and the light sensitivity. On the one hand, the dark current may be amplified by the amplifier, the black level error e may also be amplified, and thus the black level error ε is affected by the light sensitivity. On the other hand, the photocurrent and the dark current accumulated by the photodiode before a switch closes increases with the exposure time becomes longer, and thus the black level error ε is affected by the exposure time.

For example, a digital camera with or without a lens is acquired. A lid of the camera is closed, a format of a file to be outputted by the camera is set to .RAW format, and the remaining camera parameters are set to be default. For each pair of the ISO value and the exposure value, a black image is captured. For example, assuming that the exposure time of the camera is selectable from 0.1 s and 1 s, and the ISO value is selectable from 100 and 200, there exist four pairs of the ISO value and the exposure value: (0.1 s, 100), (Is, 100), (0.1 s, 200), (1 s, 200). Therefore, 4 black images are captured.

As an example, the preprocessing of the black image includes: linearizing the black image based on the black level and the white level of the digital photography device.

Assuming that the black level of the digital photography device is m', the white level is n', a pixel in the black image is BlackFrame and a corresponding pixel in the offset image is BiasFrame, the linearization of the black image may be expressed as:

$$BiasFrame = \min\left\{\max\left\{\frac{BlackFrame - m'}{n' - m'}, 0\right\}, 1\right\} \quad \text{Expression (2)}$$

In Expression (2), max{ } represents calculation of a maximum value and min{ } represents calculation of a minimum value. An offset image is obtained by limiting each pixel in the black image to a value ranging from 0 to 1 by the linearization based on the expression (2).

As an example, the second processing unit 304 may be configured to add the obtained offset image to the synthesized noise image.

For example, the second processing unit 304 may add the value of each pixel of the obtained offset image to the corresponding pixel in the synthesized noise image z so as to process the black level in the synthesized noise image z, thereby generating a processed synthesized noise image.

As an example, the second processing unit 304 may be configured to select an image block from a predetermined position in the obtained offset image, and add an offset value calculated based on the selected image block to the synthesized noise image.

For example, the offset image has a height of H and a width of W, and the predetermined position is ps. For example, pixels located in a range from H/2 to H/2+ps in height and in a range from W/2 to W/2+ps in width may be selected from the obtained offset image, as the selected image block. Those skilled in the art should understand that any image block may be selected from the obtained offset image as the selected image block. For example, ps may be determined according to experience, application scenarios, experiments or the like. For example, ps may be 128. It should be appreciated by those skilled in the art that ps may be determined to be a corresponding value so that any image block may be selected from the obtained offset image. For example, the black level in the synthesized noise image z may be processed by computing a mean value of the pixels in the selected image block and adding this mean value to the value of each pixel of the synthesized noise image z, to generate the processed synthesized noise image. It should be appreciated by those skilled in the art that other values other than the mean value may also be calculated based on the values of the pixels in the selected image block, so as to be used for processing the black level in the synthesized noise image z.

As an example, the second processing unit 304 may be configured to select a pixel from a predetermined position in the obtained offset image, and add a value of the selected pixel to the synthesized noise image.

For example, the value of a pixel located in [H/2, W/2] may be selected from the obtained offset image, and added to the value of each pixel of the synthesized noise image z, to process the black level in the synthesized noise image z so as to generate the processed synthesized noise image. It should be appreciated by those skilled in the art that the value of a pixel located at an arbitrary position may be selected from the obtained offset image to process the black level in the synthesized noise image z.

As an example, the values of R, G1, B, G2 of the processed synthesized noise image may be formed into a separate channel respectively, and the four channels may be cascaded together. The image data of each channel (in data size of H2×W/2 of each channel) may be input to the machine learning model as samples.

In the above description, the original image is linearized, noise is added to the obtained linearized image y to obtain the synthesized noise image z, and a black level in the synthesized noise image z is processed to obtain the processed synthesized noise image. Alternatively, the values of R, G1, B, G2 of the linearized image y may be formed into a separate channel respectively, the noise is added on each channel of R, G1, B. G2 of the is linearized image y. Next, the black level is processed in each channel of R, G1, B, and G2, and the processed image data of each channel is input to the machine learning model as samples.

In a case that the above processed synthesized noise image serves as samples to train the machine learning model, a display image corresponding to the original image and captured by the image acquisition device serves as a label image for training the machine learning model. In the process of training the machine learning model, the values of R, G1, B, G2 of the label image may be formed into a separate channel respectively, to correspond to the channels of R, G1, B, G2 of the processed synthesized noise image.

The above label image is described with a digital camera serves as the image acquisition device. The digital camera may be regarded as a signal conversion tool. The digital camera converts an optical signal in the real scene into a digital signal (from an optical signal to an electrical signal and then to a digital signal). The conversion is performed by the hardware of the digital camera. The digital signal obtained from the digital camera is the original image described above. Then, the digital camera performs the image signal process to convert the digital signal (i.e., the original image) into an image to be displayed (i.e., the display image). For example, the original image is an image in a RAW format captured by the digital camera, and the display image is an image in an s-RGB format obtained by converting the original image and displayed on the screen of the digital camera.

Figure 5:
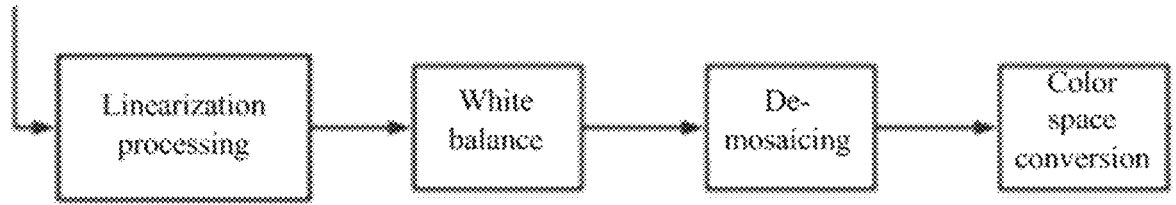
FIG. 5 is a schematic diagram illustrating image signal processing performed by a conventional digital camera.

FIG. 5 is a schematic diagram illustrating image signal processing performed by a conventional digital camera.

In FIG. 5, the linearization processing as shown in Expression (1) is firstly perform on the original image.

In FIG. 5, the linearization processing is followed by white balance. The white balance acts to eliminate the influence of a colored light source on the color of an object. For example, a red apple photographed under red light and under green light may result in totally different results. However, the "color" of the red apple (the distribution of spectral reflections on a surface of the apple) shall be an objective fact, and remains unchanged as the light source changes. In order to obtain the original color of the object, the white balance is performed. In terms of implementation, the white balance is performed by multiplying the three multipliers [R, G, B] onto the image by a dot product.

In FIG. 5, the white balance is followed by de-mosaicing. The de-mosaicing acts to transform the previous 1-channel original image into a 3-channel image that may be displayed on a display device, which is essentially linear interpolation. That is, the original image in a size of H×W becomes 3 images in a size of H×W (images in an s-RGB format).

In FIG. 5, the de-mosaicing is followed by color space conversion. In a digital camera, a three-dimensional vector (R, G. B) represents the value of a certain pixel, that is, (R, G, B) is a color base of the digital camera. However, the color base of the digital camera may be different from a color base of the display device. Color space conversion is aimed at changing the color base of the digital camera to a color base that is usable on the display device. The color space conversion is achieved by multiplying the de-mosaiced image by a 3×3 conversion matrix, which is fixed. An image in the s-RGB format may be obtained through the color space conversion. That is, the image obtained by the image signal processing is in the s-RGB format (i.e., the display image).

For example, the parameter of the machine learning model may be updated based on the display image (i.e., the label image) and the processed synthesized noise image. For example, the average distance between the display image and the processed synthesized noise image may be calculated in second normal form, and the parameters of the machine learning model may be updated according to back propagation, to obtain the trained machine learning model.

As an example, the second processing unit 304 may be configured to extract an offset value from a numerical range for offset values subject to a predetermined distribution, process a black level of an image block in the synthesized noise image based on the extracted offset value, and train the machine learning model based on the processed image block.

For example, those skilled in the art may pre-determine the size of the image block based on experience or application scenarios or experiments. For example, the image block may be an image block in a size of 1024×1024.

Processing of the black level of the image block in the synthesized noise image based on the extracted offset value is essentially perturbing the black level of the image block.

The information processing apparatus 300 according to the embodiment of the present disclosure can enhance the robustness of the machine learning model to the black level by perturbing the black level.

For example, the second processing unit 304 may add the extracted offset value to each pixel of the image block in the synthesized noise image z, to process the black level in the image block.

As an example, the predetermined distribution may be a Gaussian distribution or a uniform distribution. For example, a parameter of a distribution function of the above predetermined distribution may be determined based on experience, application scenarios, or experiments or the like. For example, the uniform distribution may be a uniform distribution conforming to (−10, 10).

As an example, the second processing unit 304 may be configured to randomly extract the offset value from the above range of values.

Figure 6:
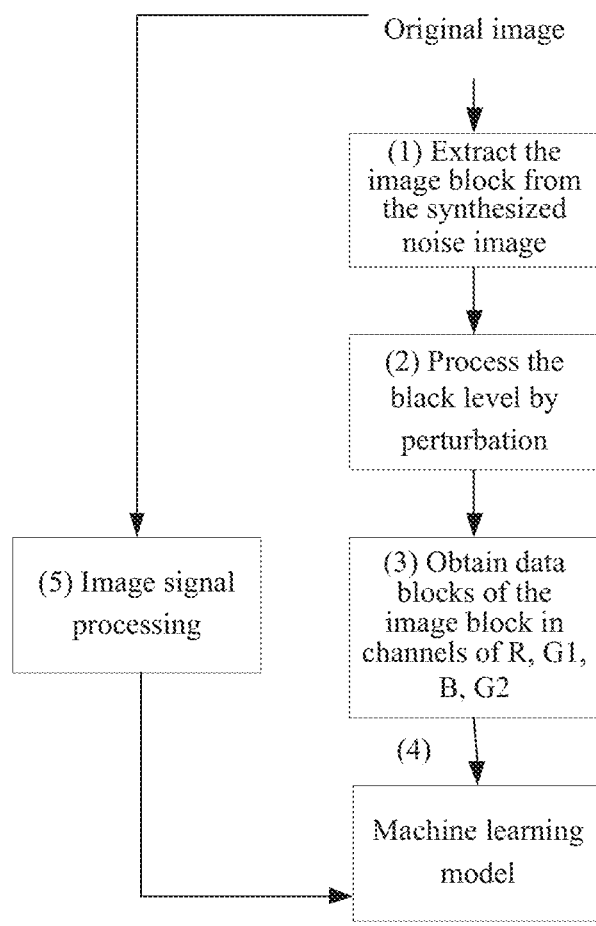
FIG. 6 is a schematic diagram illustrating training a machine learning model by perturbing the black level according to an embodiment of the present disclosure.

FIG. 6 is a schematic diagram illustrating training a machine learning model by perturbing the black level according to an embodiment of the present disclosure. In FIG. 6, an image block in a size of 1024/1024 serves as a sample.

As shown in FIG. 6, in (1), the image block is extracted from the above synthesized noise image z generated by linearizing the original image and adding noise and the like. In (2), the black level in the image block is processed by perturbation. In (3), the values of R, G1, B, G2 of the processed image block are formed into a separate channel respectively to obtain four data blocks in a size of (1024/2)×(1024/2) (i.e., each data block has a size of 512×512) and these four channels are cascaded together. In (4), the above four data blocks in a size of 512×512 are input into the machine learning model as samples. Image blocks in the display image in the s-RGB format obtained from the image signal processing in (5) on the original image serves as training labels, to train the machine learning model. For example, the average distance between the image block as a sample and the image block as a label may be calculated in the second normal form, and the parameters of the machine learning model may be updated according to back propagation, so as to obtain a trained machine learning model. The image signal processing in (5) is the same as the image signal processing in FIG. 5.

Although the perturbation of the black level of the image block in the synthesized noise image is described above, it should be appreciated by those skilled in the art that the black level of the synthesized noise image may be perturbed based on the extracted offset value (for example, adding the extracted offset value to each pixel of the synthesized noise image), which is not described in detail herein.

Corresponding to the above embodiments of the information processing apparatus, embodiments of an information processing method are provided according to the present disclosure.

Figure 7:
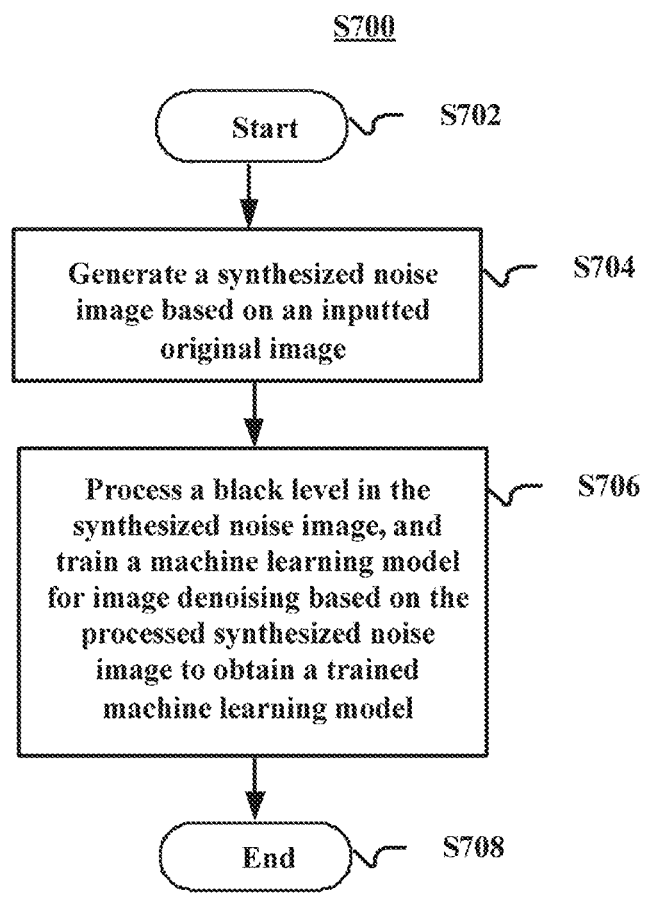
FIG. 7 is a flowchart schematically illustrating an information processing method according to an embodiment of the present disclosure.

FIG. 7 is a flowchart schematically illustrating an information processing method S700 according to an embodiment of the present disclosure.

The information processing method S700 according to the embodiment of the present disclosure starts from S702.

In S704, a synthesized noise image is generated based on an input original image.

For specific examples of the original image, reference may be made to the description of the corresponding part (e.g., the first processing unit 302) of the information processing apparatus 300, which will not be repeated here.

In S706, a black level in the synthesized noise image is processed, and a machine learning model for image denoising is trained based on the processed synthesized noise image, to obtain a trained machine learning model.

For specific examples of processing the black level, reference may be made to the description of the corresponding part (e.g., the second processing unit 304) of the information processing apparatus 300, which will not be repeated here.

The information processing method S700 ends at S708.

In the information processing method S700 according to the embodiment of the present disclosure, the black level in the synthesized noise image is processed so that the influence on training for the machine learning model due to the inaccuracy of the black level is reduced, thereby improving denoising performance of the trained machine learning model trained based on the processed synthesized noise image.

According to another embodiment of the present disclosure, an information processing device 800 is also provided.

Figure 8:
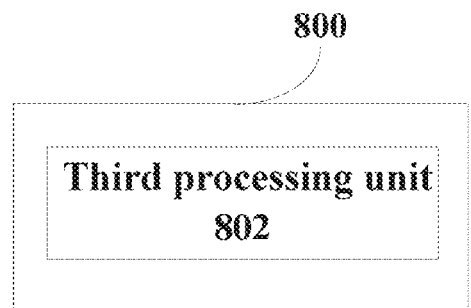
FIG. 8 is a block diagram illustrating functional modules of an information processing device according to an embodiment of the present disclosure.

FIG. 8 is a block diagram illustrating functional modules of the information processing device 800 according to an embodiment of the present disclosure. As shown in FIG. 8, the information processing device 800 includes a third processing unit 802. The third processing unit is configured to input an image to be processed into a trained machine learning model obtained by the information processing apparatus 300 or the information processing method S700, to perform denoising processing on the image to be processed.

Since a trained machine learning model with improved denoising performance is obtained through the information processing apparatus 300 or the information processing method S700, the information processing device 800 according to the embodiment of the present disclosure can more accurately remove noise in the image to be processed.

As an example, the image to be processed is a short-exposure image captured in a dim environment. The information processing device 800 can more accurately remove noise in the short-exposure image captured in the dim environment.

Corresponding to the above embodiments of the information processing device, embodiments of an information processing method is provided according to the present disclosure.

Figure 9:
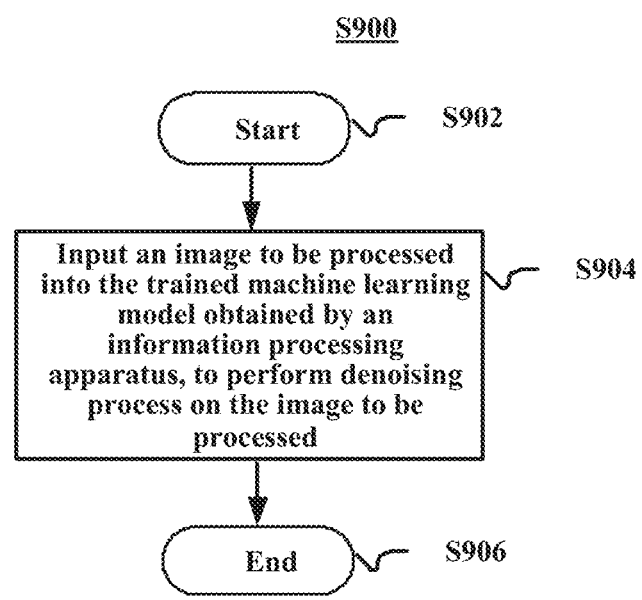
FIG. 9 is a flowchart illustrating an information processing method according to an embodiment of the present disclosure.

FIG. 9 is a flowchart schematically illustrating an information processing method S900 according to an embodiment of the present disclosure.

The information processing method S900 according to the embodiment of the present disclosure starts from S902.

In S904, an image to be processed is input into the trained machine learning model obtained by the information processing apparatus 300 or the information processing method S700, to perform denoising processing on the image to be processed.

The information processing method S900 ends at S906.

Since the trained machine learning model with improved denoising performance is obtained through the information processing apparatus 300 or the information processing method S700, the information processing method S900 according to the embodiment of the present disclosure can more accurately remove noise in the image to be processed.

The basic principle of the present disclosure is described above in conjunction with embodiments. However, it should be noted that, those skilled in the art should appreciate that, all or any of the steps or components of the method and the apparatus according to the present disclosure may be implemented in any computing device (including a processor, a storage medium, etc.) or a network of a computing device by hardware, firmware, software or a combination thereof, which can be achieved by those skilled in the art in light of the description of the present disclosure and their general circuit designing knowledge or general programming skills.

Moreover, a program product in which machine-readable instruction codes are stored is further provided according to the present disclosure. The instruction codes, when being read and executed by a machine, implements the methods according to the embodiment of the present disclosure.

Accordingly, a storage medium carrying the program product storing the machine-readable instruction codes is further included in the present disclosure. The storage medium includes but is not limited to, a floppy disk, an optical disk, a magneto-optical disk, a storage card, a memory stick and the like.

Figure 10:
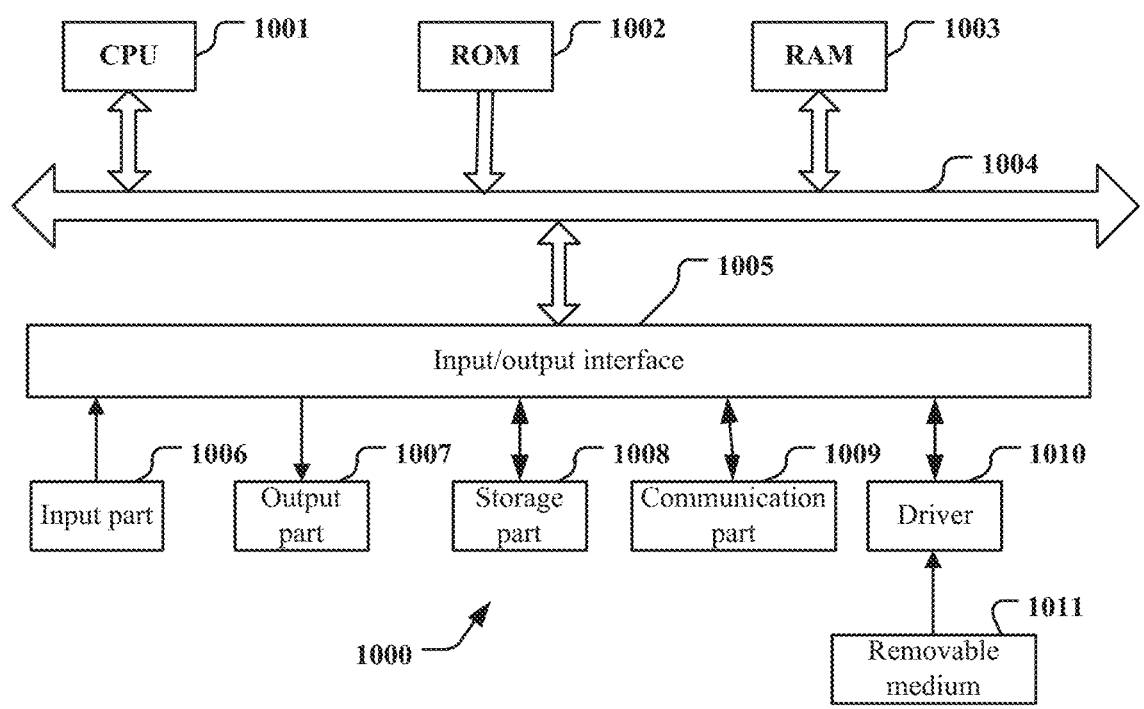
FIG. 10 is a block diagram schematically illustrating a structure of a personal computer to which embodiments of the present disclosure may be applied.

In a case of implementing the present disclosure in software or firmware, the program consisting of the software is installed to a computer with a dedicated hardware structure (such as a general-purpose computer 1000 as shown in FIG. 10) from the storage medium or network. The computer, when being installed with various programs, performs various functions.

In FIG. 10, a central processing unit (CPU) 1001 performs various processing according to a program stored in a read-only memory (ROM) 1002 or a program loaded from a storage part 1008 to a random-access memory (RAM) 1003. In the RAM 1003, data for the CPU 1001 to perform various processes or the like is also stored as necessary. The CPU 1001, the ROM 1002 and the RAM 1003 are linked with each other via a bus 1004. An input/output interface 1005 is also linked to the bus 1004.

The following components are connected to the input/output interface 1005: an input part 1006 (including a keyboard, a mouse, and the like), an output part 1007 (including a display, such as a cathode ray tube (CRT) and a liquid crystal display (LCD), a loudspeaker, and the like), a storage part 1008 (including a hard disk and the like), and a communication part 1009 (including a network interface card, such as a LAN card and a modem). The communication part 1009 performs communication processing via a network such as the Internet. A driver 1010 may also be connected with the input/output interface 1005 as needed. A removable medium 1011 such as a magnetic disk, an optical disk, a magneto-optical disk, a semiconductor memory and the like may be mounted to the driver 1010 as required, so that the computer program read therefrom is installed to the storage part 1008 as required.

In a case of implementing the above processing in software, the program consisting of the software is installed from a network, such as the Internet, or from a storage medium, such as the removable medium 1011.

It should be understood by those skilled in the art that, the storage medium is not limited to the removable medium 1011 as shown in FIG. 10 in which the program is stored and which is distributed separately from the device to provide the program for the user. The example of the removable medium 1011 includes a magnetic disk (including a soft disk (registered trademark)), an optical disk (including a compact disk read-only memory (CD-ROM) and a digital video disk (DVD)), a magneto-optical disk (including a mini disk (MD)

(registered trademark)), and a semiconductor memory. Alternatively, the storage medium may be the ROM 1002, a hard disk in the storage part 1008 or the like. The storage medium has a program stored therein and is distributed to the user along with an apparatus in which the storage medium is incorporated.

It should be further noted that, in the devices, methods, and systems according to the present disclosure, components or steps may be divided and/or recombined. These division and/or recombination should be regarded as equivalent solutions of the present disclosure.

The steps of performing the above-mentioned series of processing may naturally be performed in chronological order in the order of description, but are unnecessarily performed in the chronological order. Some steps may be performed in parallel or independently of each other.

At last, it should be noted that terms of "include", "comprise", or any other variants are intended to be non-exclusive. Therefore, a process, method, article, or device including a series of elements includes not only the elements but also other elements that are not enumerated, or also includes the elements inherent for the process, method, article or device. In addition, unless expressively limited otherwise, the statement "comprising (including) one . . . " does not exclude the case that other similar elements may exist in the process, method, article or device including the element.

Although the embodiments of the present disclosure have been described in detail above with reference to the accompanying drawings, it should be understood that the above-described embodiments are only used to illustrate the present disclosure, rather than constitute a limitation to the present disclosure. For those skilled in the art, various modifications and changes may be made to the above-mentioned embodiments without departing from the essence and scope of the present disclosure. Therefore, the scope of the present disclosure is limited only by the appended claims and their equivalent meanings.

The present technology may also be implemented as follows.

Note 1. An information processing apparatus, including a processing circuit configured to:

generate a synthesized noise image based on an input original image; and process a black level in the synthesized noise image, and train a machine learning model for image denoising based on the processed synthesized noise image to obtain a trained machine learning model.

Note 2. The information processing apparatus according to Note 1, wherein the processing circuit is configured to:

acquire predetermined image acquisition parameters from the original image, obtain a corresponding offset image based on correspondence relationship between the predetermined image acquisition parameters and offset images for processing the black level, and process the black level in the synthesized noise image based on the obtained offset image.

Note 3. The information processing apparatus according to Note 2, wherein the correspondence relationship is generated by:

obtaining, based on a black image captured for each of the predetermined image acquisition parameters of an image acquisition device, the offset image corresponding to each predetermined image acquisition parameters in a dim environment.

Note 4. The information processing apparatus according to Note 3, wherein, the image acquisition device is a digital photography device, and the predetermined image acquisition parameters include exposure time and light sensitivity of the digital photography device, and the correspondence relationship is generated by:

closing a lid of the digital photography device, capturing the black image for each pair of parameters of the exposure time and the light sensitivity of the digital photography device, and preprocessing the black image to obtain the offset image corresponding to each pair of parameters.

Note 5. The information processing apparatus according to Note 4, wherein the preprocessing the black image includes: linearizing the black image based on a black level and a white level of the digital photography device.

Note 6. The information processing apparatus according to any one of Notes 2 to 5, wherein the processing circuit is configured to add the obtained offset image to the synthesized noise image.

Note 7. The information processing apparatus according to any one of Notes 2 to 5, wherein the processing circuit is configured to: select an image block from a predetermined position in the obtained offset image, and add an offset value calculated based on the selected image block to the synthesized noise image.

Note 8. The information processing apparatus according to any one of Notes 2 to 5, wherein the processing circuit is configured to: select a pixel from a predetermined position in the obtained offset image, and add a value of the selected pixel to the synthesized noise image.

Note 9. The information processing apparatus according to Note 1, wherein the processing circuit is configured to:

extract an offset value from a numerical range for offset values subject to a predetermined distribution, and process a black level of an image block in the synthesized noise image based on the extracted offset value, and train the machine learning model based on the processed image block.

Note 10. The information processing apparatus according to Note 9, wherein the predetermined distribution is a Gaussian distribution or a uniform distribution.

Note 11. The information processing apparatus according to Note 9 or 10, wherein the processing circuit is configured to randomly extract the offset value from the numerical range.

Note 12. The information processing apparatus according to any one of Notes 1 to 11, wherein the processing circuit is configured to: perform noise processing on the original image based on noise parameters acquired from the original image, to generate the synthesized noise image.

Note 13. The information processing apparatus of Note 12, wherein the processing circuit is configured to:

linearize the original image based on a black level and a white level acquired from the original image, to obtain a linearized image of the original image; and perform noise processing on the linearized image, to generate the synthesized noise image.

Note 14. The information processing apparatus according to any one of Notes 1 to 13, wherein the original image is a long-exposure image captured by an image acquisition device in a long-exposure state, and the synthesized noise image is utilized to simulate a short-exposure image captured by the image acquisition device in a dim environment.

Note 15. The information processing apparatus according to any one of Notes 1 to 14, wherein the original image includes RGB data in a RAW format.

Note 16. The information processing apparatus according to any one of Notes 1 to 15, wherein the machine learning model is a neural network.

Note 17. An information processing device, including:

a processing circuit configured to: input an image to be processed into the trained machine learning model obtained by the information processing apparatus according to any one of Notes 1 to 16, to perform denoising processing on the image to be processed.

Note 18. The information processing device according to Note 17, wherein the image to be processed is a short-exposure image captured in a dim environment.

Note 19. An information processing method, including:

generating a synthesized noise image based on an input original image; and processing a black level in the synthesized noise image, and training a machine learning model for image denoising based on the processed synthesized noise image to obtain a trained machine learning model.

Note 20. An information processing method, including:

inputting an image to be processed into the trained machine learning model obtained by the information processing apparatus according to any one of Notes 1 to 16, to perform denoising processing on the image to be processed.

Note 21. A computer-readable storage medium having stored thereon computer-executable instructions that, when executed, implement the information processing method according to Note 19 or 20.

The invention claimed is:

1. An information processing apparatus, comprising:
a processing circuit configured to:
generate a synthesized noise image based on an input original image; and
process a black level in the synthesized noise image, and train a machine learning model for image denoising based on the processed synthesized noise image to obtain a trained machine learning model,
wherein the processing circuit is further configured to:
acquire predetermined image acquisition parameters from the original image,
obtain a corresponding offset image based on correspondence relationship between the predetermined image acquisition parameters and offset images for processing the black level, and
process the black level in the synthesized noise image based on the obtained offset image.

2. The information processing apparatus according to claim 1, wherein the correspondence relationship is generated by:
obtaining, based on a black image captured for each of the predetermined image acquisition parameters of an image acquisition device, the offset image corresponding to each predetermined image acquisition parameter in a dim environment.

3. The information processing apparatus according to claim 2, wherein,
the image acquisition device is a digital photography device, and the predetermined image acquisition parameters include exposure time and light sensitivity of the digital photography device, and
the correspondence relationship is generated by:
closing a lid of the digital photography device, capturing the black image for each pair of parameters of the exposure time and the light sensitivity of the digital photography device, and preprocessing the black image to obtain the offset image corresponding to each pair of parameters.

4. The information processing apparatus according to claim 3, wherein the preprocessing the black image comprises: linearizing the black image based on a black level and a white level of the digital photography device.

5. The information processing apparatus according to claim 1, wherein the processing circuit is configured to add the obtained offset image to the synthesized noise image.

6. The information processing apparatus according to claim 1, wherein the processing circuit is configured to:
select an image block from a predetermined position in the obtained offset image, and add an offset value calculated based on the selected image block to the synthesized noise image.

7. The information processing apparatus according to claim 1, wherein the processing circuit is configured to:
select a pixel from a predetermined position in the obtained offset image, and add a value of the selected pixel to the synthesized noise image.

8. The information processing apparatus according to claim 1, wherein the processing circuit is configured to:
 extract an offset value from a numerical range for offset values subject to a predetermined distribution, and
 process a black level of an image block in the synthesized noise image based on the extracted offset value, and train the machine learning model based on the processed image block.

9. The information processing apparatus according to claim 8, wherein the predetermined distribution is a Gaussian distribution or a uniform distribution.

10. The information processing apparatus according to claim 8, wherein the processing circuit is configured to randomly extract the offset value from the numerical range.

11. The information processing apparatus according to claim 1, wherein the processing circuit is configured to: perform noise processing on the original image based on noise parameters acquired from the original image, to generate the synthesized noise image.

12. The information processing apparatus according to claim 11, wherein the processing circuit is configured to:
 linearize the original image based on a black level and a white level acquired from the original image, to obtain a linearized image of the original image; and
 perform the noise processing on the linearized image, to generate the synthesized noise image.

13. The information processing apparatus according to claim 1, wherein the original image is a long-exposure image captured by an image acquisition device in a long-exposure state, and the synthesized noise image is utilized to simulate a short-exposure image captured by the image acquisition device in a dim environment.

14. The information processing apparatus according to claim 1, wherein the original image comprises RGB data in a RAW format.

15. The information processing apparatus according to claim 1, wherein the machine learning model is a neural network.

16. An information processing device, comprising:
a processing circuit configured to: input an image to be processed into the trained machine learning model obtained by the information processing apparatus according to claim 1, to perform denoising processing on the image to be processed.

17. The information processing device according to claim 16, wherein the image to be processed is a short-exposure image captured in a dim environment.

18. An information processing method performed by an information processing apparatus, the method comprising:

generating a synthesized noise image based on an input original image; and processing a black level in the synthesized noise image, and training a machine learning model for image denoising based on the processed synthesized noise image to obtain a trained machine learning model, wherein the method further comprises:

acquiring predetermined image acquisition parameters from the original image, obtaining a corresponding offset image based on correspondence relationship between the predetermined image acquisition parameters and offset images for processing the black level, and processing the black level in the synthesized noise image based on the obtained offset image.

* * * * *